Jan. 8, 1957 W. R. PEARSON 2,776,792
DEVICE FOR STORING FROZEN FOOD PACKAGES
Filed Nov. 3, 1953
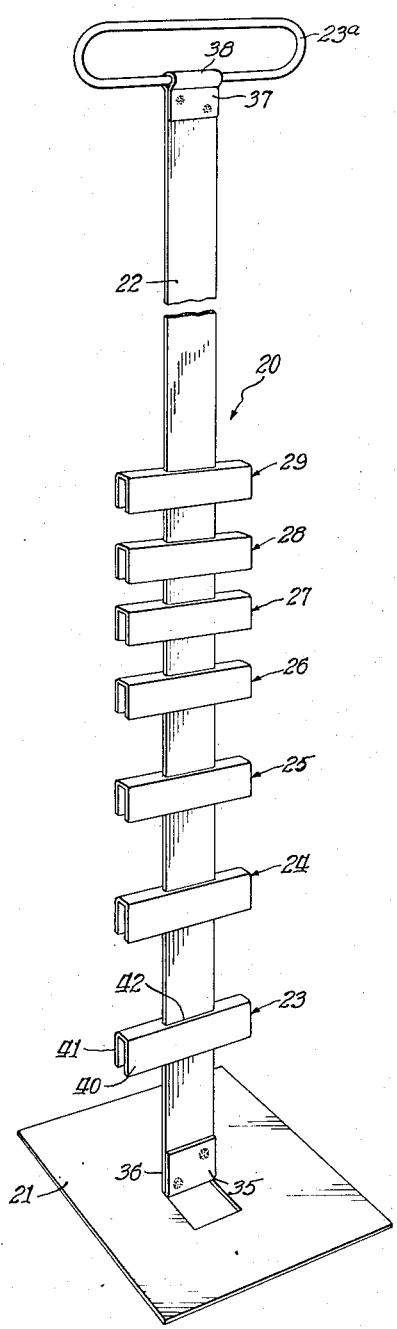
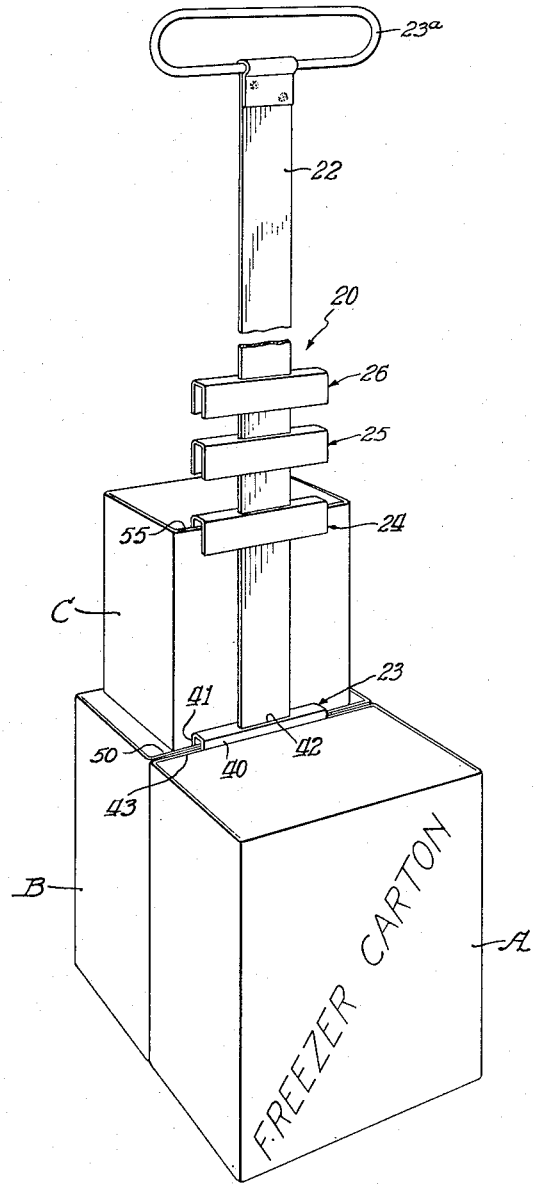
Inventor:
Warren R. Pearson
By: Joseph M. Gartner
Atty.

United States Patent Office 2,776,792
Patented Jan. 8, 1957

2,776,792

DEVICE FOR STORING FROZEN FOOD PACKAGES

Warren R. Pearson, North Muskegon, Mich., assignor to Borg-Warner Corporation, Chicago, Ill., a corporation of Illinois Application November 3, 1953, Serial No. 390,032

3 Claims. (Cl. 224—45)

This invention relates, in general, to devices for storing frozen food packages in chest-type freezers, and is particularly concerned with a rack upon which frozen food cartons may be mounted for advantageous and convenient access thereto when stored in a chest-type freezer.

Otherwise stated, the invention is embodied in a rack having suitable supports and package retaining means effective to maintain the frozen food packages in stacked relationship and having means whereby the rack may be conveniently removed from its normal storage position in a chest-type freezer for convenient and advantageous access to the packages without disturbing adjacent packages stored in the freezer.

Heretofore, the frozen food packages have been stored in chest-type freezers in a packed relationship, and in order to remove some of the packages it has usually been necessary to disturb or remove other packages stored in the freezer in order to obtain access to the desired package.

Accordingly, it is an important object and accomplishment to provide means whereby packages may be conveniently stacked in the freezer and an entire stack may be removed for ready access to one or more desired freezer food cartons maintained in the stack.

An ancillary object and accomplishment of the invention is to provide a new and improved device for storing frozen food packages in chest-type freezers and which is adapted to be economically manufactured and which is so designed as to permit the manufacture and assembly in accordance with present day large scale mass production methods of construction and assembly.

The invention seeks, as a final object and accomplishment, to provide a rack adapted for storing frozen food packages and which is particularly characterized by a design arrangement to more advantageously and satisfactorily perform the functions required of it and adapted to provide a compact unit which will successfully combine the factors of structural simplicity and durability and yet be economical to manufacture.

Additional objects, features and advantages of the invention disclosed herein will be apparent to persons skilled in the art after the construction and operation are understood from the within description.

It is preferred to accomplish the various objects of this invention and to practice the same in substantially the manner as more fully described herein, and as more particularly pointed out in the appended claims.

Embodiments of the invention are disclosed in the accompanying drawings forming a part hereof and wherein:

Fig. 1 is a perspective view of a rack adapted for storing frozen food packages and embodying the features of the present invention; and Fig. 2 is a perspective view of the rack depicted in Fig. 1 and illustrating the disposition of freezer cartons on the rack.

The drawings are to be understood to be more or less of a schematic character for the purpose of illustrating and disclosing a preferred form of the improvements contemplated herein, and in the drawings like reference characters identify the same parts in the several views.

In the exemplary embodiment of the invention depicted in Figs. 1 and 2, I have illustrated the rack for storing frozen food packages and with which the present invention is particularly concerned, as being designated in its entirety by the numeral 20 and comprising, in general, a support 21, an upstanding post 22, one end of which is fixedly secured to the support 21 and the other end of which is provided with a handle 23a, a plurality of retainer clips as at 23, 24, 25, 26, 27, 28 and 29 arranged for sliding relation with respect to the upstanding post 22.

In accordance with the construction of the present invention, the support 21 may comprise a flat sheet, the central regions thereof being suitably cut out to define a tab 35 to which the lower end 36 of the upstanding post 22 may be fixedly secured by welding or bonding. Thus, it can be seen in Fig. 1 that the upstanding post 22 is maintained in its upright position by virtue of the support 21.

The upstanding post 22 may be formed of a flat strip with the top end thereof as at 37 defining a loop 38 adapted to accommodate adjacent portions of the handle 23a.

Because the retainer clips as at 23, 24, 25, 26, 27, 28 and 29 are of identical construction, it is deemed sufficient for all intentions and purposes herein contained to describe only one of them in detail. Accordingly, it can be seen in Fig. 1 that the retaining clip 23 comprises an inverted U-shaped member defining legs 40 and 41 with the looped portion thereof having an aperture 42 adapted to receive adjacent portions of the upstanding post 22. It is to be understood that each of the retainer clips is carried by the upstanding post 22 for easy sliding relationship therebetween.

Although the rack 20 is preferably made of metal, it is within the purview of this invention that the rack 20 may be made entirely or in part of a plastic or other composition having similar characteristics. Appropriate colors should be selected in order to appeal to the aesthetic senses of the user.

Attention is now invited to Fig. 2 wherein there is disclosed the rack 20 as having mounted thereupon freezer cartons indicated as at A, B, and C.

In operation, the freezer carton as at A is placed on the rack with the tuck edge 43 of the package A disposed adjacent the upstanding post 22 and the leg 40 of the retainer clip 23 is inserted in the tuck edge 43 of the package so that the package A is held firmly to the upstanding post 22 as a unit.

The freezer carton B likewise is disposed so that the tuck edge 50 thereof is disposed adjacent the other side of the upstanding post 22, whereupon the leg 41 of the retainer clip 23 may be conveniently inserted in the tuck edge 50 of the package B thereby to retain this package firmly to the rack 20.

In Fig. 2, it can be seen that various sized packages may be secured to the rack 20. For example, attention is invited to freezer carton C which is disposed upon the freezer carton B with the tuck edge 55 of the carton C being disposed adjacent the upstanding post 22 so that a leg of the retaining clip 24 may be conveniently inserted in the tuck edge 55, thereby to maintain the carton C in its position on the rack 20 as shown. Likewise, other cartons may be added to the rack.

After the rack is full, it can be seen that the cartons disposed thereupon are in a stacked relationship and may be conveniently inserted in the chest-type freezer for storage. In the event that it is desired to remove one or more packages from the rack 20, the rack is removed from the freezer by means of the handle 23a whereupon all of the cartons being maintained on the rack are conveniently accessible for their removal. After a carton has been removed from the rack, the rack may be quickly and easily replaced in its normal position in the freezer without disturbing the adjacent packages.

Because of its simple construction, the rack for storing frozen food packages contemplated herein is economical to manufacture and is readily adaptable to mass production manufacturing methods.

From the foregoing disclosure, it may be observed that I have provided a rack for storing frozen food packages which efficiently fulfills the objects as hereinbefore set forth and which provides numerous advantages which may be summarized as follows:

1. Structurally simple, efficient and durable;
2. Economical to manufacture and readily adaptable to mass production manufacturing principles; and
3. The provision of a device for storing frozen food packages in chest-type freezers which may be employed to advantage in effecting removal of selected freezer cartons disposed and maintained on the device without necessitating the disturbance of other freezer cartons disposed in the freezer.

While I have illustrated a preferred embodiment of my invention, many modifications may be made without departing from the spirit of the invention, and I do not wish to be limited to the precise details of construction set forth but wish to avail myself of all changes within the scope of the appended claims.

I claim:

1. A rack for tiering frozen food packages of different sizes in adjacent but separate stacks, said frozen food packages having a tuck edge, said rack comprising a base, an upstanding post carried by said base, means defining a handle carried by the upper regions of said post, a plurality of generally inverted U-shaped retaining members each defining legs with the looped portion thereof having an aperture adapted to receive adjacent portions of the upstanding post, said retaining members being carried by said upstanding post for sliding relationship therebetween, and the legs of said retaining members being respectively inserted in the tuck edges of said frozen food packages to maintain said packages in stacked relationship with respect to said rack.

2. In a rack for tiering a plurality of different sized frozen food packages in adjacent groups, each package having a tuck edge and each group arranged to form a separate stack in which each package is supported by the package next below, a base for supporting the lowermost package of each stack, an upstanding post mounted upon said base, means defining a handle carried by the upper end of said post: the combination therewith of a plurality of inverted U-shaped retaining members, each member defining two horizontally extending legs depending from the portion connecting said legs, each member being slidably mounted upon said post with said legs thereof respectively adapted to engage the tuck edges of a pair of packages adjacent said post where each package of the pair thereof is located in a separate stack.

3. In a rack for tiering a plurality of different sized frozen food packages in adjacent groups, each package having a tuck edge and each group arranged to form a separate stack in which each package is supported by the package next below, a base for supporting the lowermost package of each stack, an upstanding post mounted upon said base, means defining a handle carried by the upper end of said post: the combination therewith of a plurality of inverted U-shaped retaining members each member defining two flat legs of large area depending from a portion connecting said legs, each member slidably engaging said post in the region of said connecting portion and said connecting portion positioning each leg at a spaced distance from said post to engage the legs of said members with the tuck edges of different packages on opposite sides of the post where the packages so engaged constitute a layer in separate stacks.

References Cited in the file of this patent
UNITED STATES PATENTS

| | | |
|---|---|---|
| 462,242 | Edgar | Nov. 3, 1891 |
| 1,446,036 | Dodd | Feb. 20, 1923 |
| 2,144,825 | Allison | Jan. 24, 1939 |
| 2,312,256 | Lumley | Feb. 23, 1943 |
| 2,532,022 | Gunderson | Nov. 28, 1950 |
| 2,613,860 | Hoffman | Oct. 14, 1952 |
| 2,646,911 | Holmberg | July 28, 1953 |